United States Patent Office 3,073,841
Patented Jan. 15, 1963

3,073,841
CERTAIN 1-IMIDAZOLINYL METHYL,
2-ARYL BENZIMIDAZOLES
Walter Schindler, Riehen, near Basel, Switzerland, assignor to Geigy Chemical Corporation, Ardsley, N.Y., a corporation of Delaware
No Drawing. Filed Sept. 14, 1961, Ser. No. 137,981
Claims priority, application Switzerland Sept. 15, 1960
4 Claims. (Cl. 260—309.2)

The present invention concerns new benzimidazole compounds, in particular it concerns benzimidazoles substituted in the 1-position by the imidazolinyl-(2)-methyl radical, which have valuable pharmacological properties.

It has now been found that such compounds corresponding to the general formula

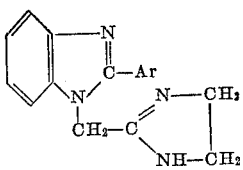

wherein Ar represents the phenyl, methylphenyl or chlorophenyl radical,
as well as their pharmaceutically acceptable salts, have pharmacologically valuable properties. In particular, they stimulate smooth muscle.

The compounds of the Formula I are especially useful as uterus-contracting agents of low toxicity for treatment of atonia uteri, especially post partum. They are administered intravenously or intramuscularly as aqueous solution of their salts, preferably hydrochlorides.

To produce the new compounds of the general Formula I, an alkali metal compound of a benzimidazole of the general formula

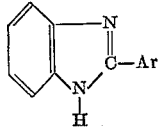

wherein Ar has the meaning given above, is reacted with a compound of the general formula

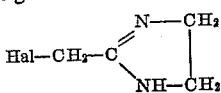

wherein Hal is a halogen atom, preferably chlorine or bromine. The reaction is perferably performed in the warm in an organic solvent, e.g. in toluene or another hydrocarbon of the benzene series at the boiling temperature thereof. The benzimidazoles of the general Formula II are advantageously converted into their alkali metal compounds, e.g. by treating with sodium amide, lithium hydride, potassium amide, sodium or potassium, just before said reaction of the alkali metal compound of benzimidazole of the general Formula II with the compound of general Formula III.

Starting materials of the general Formula II are already known and can be readily produced by reacting o-phenylenediamine with benzaldehyde, methyl benzaldehydes or chlorobenzaldehydes. Compounds of the general Formula III are also known. They are obtained e.g. by condensing α-chloro- or α-bromo-acetonitrile with ethylenediamine.

The compounds of the general Formula I form salts with inorganic or organic acids such as, e.g. hydrochloric acid, hydrobromic acid, sulphuric acid, phosphoric acid, methane sulphonic acid, ethane disulphonic acid, acetic acid, succinic acid, maleic acid, fumaric acid, malic acid, tartaric acid, citric acid, benzoic acid or mandelic acid. Some of such salts are easily soluble in water.

The following example further illustrates the production according to the invention of the new compounds. Parts are given therein as parts by weight and their relationship to parts by volume is as that of grammes to cubic centimetres. The temperatures are in degrees centigrade.

EXAMPLE (a) 32 parts of o-phenylenediamine are dissolved in 95 parts by volume of ethanol and 36 parts of p-methyl benzaldehyde are slowly added dropwise at 0°. 90 parts of nitrobenzene are then added to the mixture which is then boiled while azeotropically distilling off the ethanol and the water formed. When the reaction mixture reaches the boiling point of the nitrobenzene it is kept at this temperature for another 15 minutes. It is then cooled and the equivalent amount of anhydrous ethanolic hydrochloric acid is added. The crystals of 2-(p-methylphenyl)-benzimidazole hydrochloride which precipitate are filtered off under suction and washed with a little anhydrous ethanol. The hydrochloride is suspended in water, concentrated sodium carbonate solution is added to the suspension and the base which precipitates is filtered off under suction. It is washed with water and recrystallised from ethanol, M.P. 276–278°.

(b) 6 parts of 2-(p-methylphenyl)-benzimidazole are dissolved in 200 parts by volume of toluene and a suspension of 1.5 parts of sodium amide in toluene is added. The reaction mixture is refluxed for 18 hours, then cooled to 50°, the benzene solution of the base from 7 parts of 2-chloromethyl-2-imidazoline hydrochloride is added and the whole is heated for 2 hours at 50–60° and then refluxed for 2 hours. After cooling, water is added to the reaction mixture and the basic portions are extracted from the benzene phase by extracting three times with 2 N-acetic acid. The acid extracts are made alkaline and the crystals which precipitate are recrystallised from ethyl acetate. The 1-(2'-imidazolin-2'-ylmethyl)-2-(p-methylphenyl)-benzimidazole so obtained melts at 198–199°.

On using 32 parts of benzaldehyde or 42.4 parts of p-chlorobenzaldehyde in (a), the 1-(2'-imidazolin-2'-ylmethyl)-2-phenyl-benzimidazole (M.P. 175°) and 1-(2'-imidazolin-2'-ylmethyl)-2-(p-chlorophenyl) - benzimidazole respectively are obtained in an analogous manner.

What I claim is:
1. A member selected from the group consisting of benzimidazoles of the formula

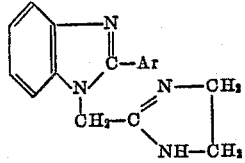

wherein Ar is a member selected from the group consisting of phenyl, methylphenyl and chlorophenyl,
and the pharmaceutically acceptable salts thereof.
2. 1-(2'-imidazolin-2'-ylmethyl)-2-(p - methylphenyl)-benzimidazole.
3. 1-(2'-imidazolin-2'-ylmethyl)-2 - phenyl - benzimidazole.
4. 1-(2'imidazolin-2'-ylmethyl)-2-(p - chlorophenyl)-benzimidazole.

References Cited in the file of this patent
UNITED STATES PATENTS
2,945,044    Hoffmann et al. _____ July 12, 1960
2,987,522    Shen _____ June 6, 1961